June 10, 1947.　　　　G. BUCKY　　　　2,422,077
CAMERA SHUTTER SYSTEM
Filed Sept. 27, 1944　　　　2 Sheets-Sheet 1

INVENTOR.
GUSTAV BUCKY
BY
ATTORNEY

June 10, 1947.  G. BUCKY  2,422,077
CAMERA SHUTTER SYSTEM
Filed Sept. 27, 1944    2 Sheets-Sheet 2

INVENTOR.
GUSTAV BUCKY
BY Walter S. Bleston
ATTORNEY

Patented June 10, 1947

2,422,077

UNITED STATES PATENT OFFICE 2,422,077

CAMERA SHUTTER SYSTEM

Gustav Bucky, New York, N. Y.

Application September 27, 1944, Serial No. 555,948

9 Claims. (Cl. 240—2)

The invention relates to a shutter system for artificial light in connection with photographic cameras or other optical devices where light of predetermined intensity or quality is intended to strike an object for a predetermined time. The invention contemplates to provide a shutter system which renders it possible to employ, for the indicated purpose, flood lights rather than flash lights. This is an advantage because of the greater constancy of the flood lights as to their color temperature and because of their appreciably lower cost, a flash light bulb being useful for one exposure only, whereas a flood light bulb, in a device hereinafter described, may be used up to 2,000 times and even more frequently. An example of an optical device to which the invention may be advantageously applied is a camera as disclosed in my U. S. Patent No. 2,239,379, dated April 22, 1941. Such a camera, although useful for many other purposes, is particularly helpful to a physician in taking photographs of parts of the human body. Frequently in such cases, heterogeneous conditions prevail, in that the photographing process requires a rather strong illumination of the object, whereas the object proper, e. g., the human eye, does not stand the exposure to very strong and concentrated light, at least not for more than a very short time. For that reason, I have suggested, in the above-mentioned patent, the application of two shutters, one for the camera objective and the other one for the light source illuminating the object, the shutters operating in such timed relationship to each other that the objecive shutter opens before the light shutter opens, and that it closes at the same time when or after the light is shut off. In other words, the light shutter is determinative for the actual time of the exposure of the plate or film, and the time of exposure of the object to the active light rays can be limited to the required minimum. However, the mechanical apparatus disclosed in my earlier patent to insure correct operation of the camera in a more or less foolproof manner is rather complicated. Furthermore, it occurred that the earlier apparatus though fully reliable as to the time of exposure did not entirely exclude an undesirable variability of the quantity of light and color temperature, even if the same light source was in use. I have found that such variability is mainly caused by the fact that an electric lamp requires a certain time from the beginning of its energization until it has developed its full candle power.

The present invention aims, therefore, to provide, for the indicated purpose, a shutter system which is simple in structure and foolproof in operation, and whereby constancy of the light intensity and color temperature used in taking pictures can be obtained.

The invention consists in the combination of electric means to operate and/or actuate the shutters, and of an electric device for delaying energization of such means until the light source has reached its full power.

Further objects and details of the invention will be apparent from the description given hereinafter and the accompanying drawing illustrating an embodiment thereof by way of example. In view of the fact that the invention is applicable with special advantage to a photographic apparatus of the type disclosed in my abovementioned patent, the embodiment is shown in connection with such camera. However, it is to be understood that the invention is not limited in its applicability to any particular kind of apparatus.

Figure 1:
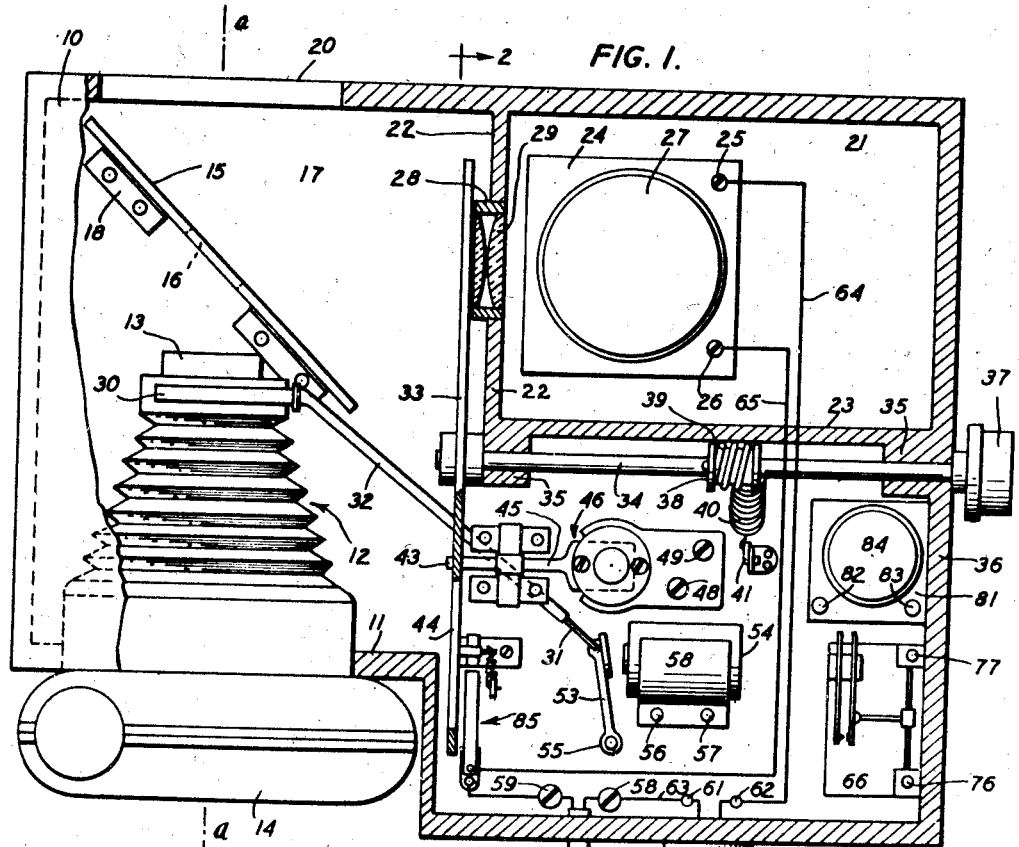
Fig. 1 is a top plan view of the said embodiment, part of the upper housing portion being broken away.
Figure 3:
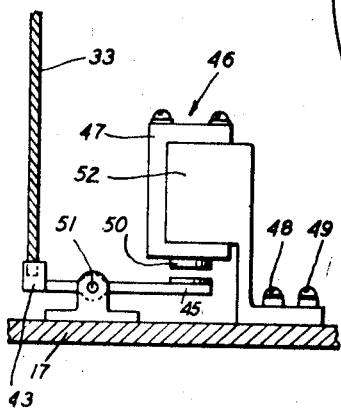
Fig. 3 is a side elevation of a part shown in Fig. 1.

Referring now to the drawing, a housing 10 supports, in the rear wall 11 of its lefthand portion, a photographic camera 12 which projects with its objective 13 into the interior of the housing whereas the camera portion 14 constituting the receptacle for a plate or film is outside the housing. In front of the objective, a mirror 15 with a central opening 16 is secured to the housing bottom 17 by means 18 at an angle of 45° to the objective axis a—a. The front wall 19 of the housing is provided with an opening 20 coaxial with the objective. In the righthand front corner of the housing a compartment 21 is formed by two partitions 22 and 23. The compartment contains a socket 24 with terminals 25 and 26 for an electric lamp 27. Opposite the center of mirror 15, partition 22 forms a mount 28 for a collector lens system 29 so that rays from lamp 27 passing through the lens system 29 will be reflected by the mirror upon an object in front of opening 20 whereas light rays from such object may reach the objective 13 on their way through the openings 20 and 16. The objective of the camera is provided with a shutter mechanism 30 which may be of any suitable and conventional type, but is preferably of such a design that it can be pulled open against the restraint of a spring (not shown)

by a wire 31 guided in a tube 32. Another shutter mechanism controls the light rays emitted by lamp 27. This mechanism comprises a disc 33 rotatable in front of the lens system 29 and journalled with its shaft 34 in bearings 35 attached to or integral with the partition 23. Shaft 34 projects from the righthand housing wall 36 so that it can be turned by manipulation of the knob 37 secured thereto. A reel 38 is provided on shaft 34 and a flexible member 39 is secured to the reel and slung one or a few turns around it. With its other end the member 39 is attached to a tension spring 40 secured to the housing bottom at 41 as clearly shown in Fig. 2. The disc 33 is notched at 42 so as to form an abutment for a detent 43 and has an eccentrically located opening 44 on a radius spaced a predetermined angle from the radius on which the lens system is located when the detent 43 engages the notch 42. In the illustrated example, the mentioned angle is 180°. Thus, if the detent is withdrawn from its holding position, spring 40 will cause the disc 33 to turn in the direction of the arrow *d* in Fig. 2, and the center of the opening 44 will be in registry with the center of the lens system 29 after half a revolution of the disc 33. Hence, it will be clear that the opening time of this shutter mechanism depends on the diameters of the lens system 29 and of the opening 44 respectively and on the angular velocity imparted to the disc by spring 40. On the other hand, the delay between the moment of the detent release and the opening of the passage of the light rays will depend on the same angular velocity and on the angular spacing of the opening 44 from the lens system 29 when the detent 43 engages the notch 42. The detent 43 as clearly shown in Fig. 3, is part of an armature lever 45 of an electric relay 46 comprising a coil 47 with terminals 48 and 49 and a core 50. Lever 45 is pivoted at 51, and the weight distribution is such that the detent end of the lever tends to bear against the rim of the disc 33 and to engage the notch 42 when in registry therewith. The coil 47 is carried by a bracket 52 mounted on the bottom 17 of the housing. Thus, if the relay is energized it will remove the detent from holding position so that the disc 33 will rotate, and if the relay is deenergized before the completion of a disc revolution the detent will reengage the notch and stop the disc when a revolution has been completed.

In order to operate the objective shutter 30, the wire 31 is secured to an armature 53 of a second relay 54. The armature is pivoted at 55 and the relay coil with terminals 56 and 57 is fastened to the housing bottom by means of the bracket 58. Current can be supplied to the two shutter relays as well as to the lamp 27 through a conductor cord 56 with conventional plug 57 connected to two terminals 58 and 59 inside the housing 10 and a main switch 60 with terminals 61 and 62 secured to the housing wall. Switch 60 may be of any suitable and conventional type. However, it is preferred to use a push button switch which closes the connected circuit or circuits as long as the button is pressed and opens the circuit when released. In order to simplify the manipulation of the camera and to render it foolproof, it is desired that the operation of only one switch causes energization of lamp 27 and of the mentioned relays in the proper timed relationship. From what has been stated hereinbefore, it will be apparent that the objective shutter 30 is positively connected to the relay 54 so as to open immediately when the relay is energized and stays open as long as the armature 53 is attracted. Contrary thereto, the lamp shutter comprising the disc 33 will open only after the disc 33 has turned a predetermined angle. Hence, simultaneous energization of both relays 46 and 54 will cause opening of both shutters with, however, a time lag of the lamp shutter in relation to the objective shutter as it has been indicated as a purpose of the invention. Still, it would not do to connect the relays directly in parallel relationship to a circuit containing lamp 27 because the time lag of the lamp shutter would, in most instances, be insufficient to bridge the time required by lamp 27 to reach full power. For this reason, a delayed-action switch is provided, according to the invention, for the circuit or circuits energizing said relays.

Figure 4:
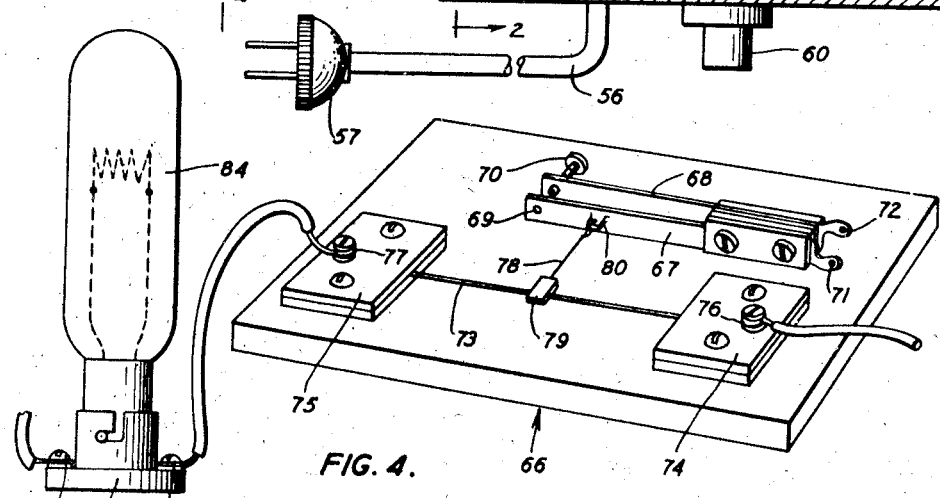
Fig. 4 is a perspective view of another part shown in Fig. 1.

In the illustrated embodiment the delayed-action switch clearly shown in Fig. 4 and in general denoted by 66 comprises a pair of contact carriers 67 and 68. The contact of the one may be a point 69 whereas the other is preferably formed by the end of a set screw 70 in order to allow for a certain adjustability. The contact carriers having terminals 71 and 72 respectively, may be made of resilient material and so set with respect to each other as to tend to cause engagement of the contacts. In a direction substantially at right angles to that in which one of the contacts moves in relation to the other, a piece of wire 73 is spanned between two insulated fixed members such as posts or blocks 74 and 75. The wire is preferably of a material which lengthens appreciably when heated by a current flowing therethrough. An alloy containing nickel and chromium has been found suitable for the purpose. The terminals of the wire are at 76 and 77. Approximately to the middle of the wire a member 78 which also may be of wire, is attached by means indicated at 79 and, with its other end, secured to the contact carrier 67 at 80. The length of the wire 78 is such that the contact 69 is held apart from contact 70 when the wire 73 is cold, i. e. substantially straight. The contact 70, on the other hand, is so set that it will be engaged by contact 69 when the wire 73 has reached a certain temperature due to a current passing therethrough, and when in consequence it is lengthened and bulges between the posts 74 and 75. As the heating of the wire requires an appreciable time from the beginning of the current flow, engagement of the contacts will occur with a corresponding delay. The length of the delay largely depends on the dimensions of the wire, its resistance, and the voltage across the wire terminals 76 and 77. Consequently, if the switching device just described is part of a circuit in which a certain voltage prevails, then a means for influencing the length of the delay is an adjustable or exchangeable resistor connected in series with the wire 73. I have found, however, that in the apparatus according to my invention, a change of the delay is required only if the type of the lamp 27 is changed. For reason of simplification, I prefer, therefore, to use another electric lamp of suitable resistance as such a resistor to be exchanged only when the lamp 27 is exchanged for one of other characteristics. The application of a lamp, e. g., a 100-watt lamp, as a resistor, offer the further advantage that its resistance, which changes with temperature, returns to its original value after cooling in approximately the same time which is required for the heated wire of the delay relay to return to its original resistance value. Thereby it is insured that making and breaking the contact requires the same length of time. Accordingly, in the illustrated embodiment a second lamp socket 81 with terminals 82 and 83 is secured interiorly of the housing 10 and in close proximity of the delayed-action switch 66, and a resister lamp 84 is inserted in socket 81.

For reasons to be explained hereinafter, it is advisable to apply furthermore, a circuit breaker or third switching device whereby the entire current supply to the apparatus is discontinued after the opening 44 of the lamp shutter has passed the lens system 29, or at least when the disc 33 has completed the major portion of a revolution.

Figure 2:
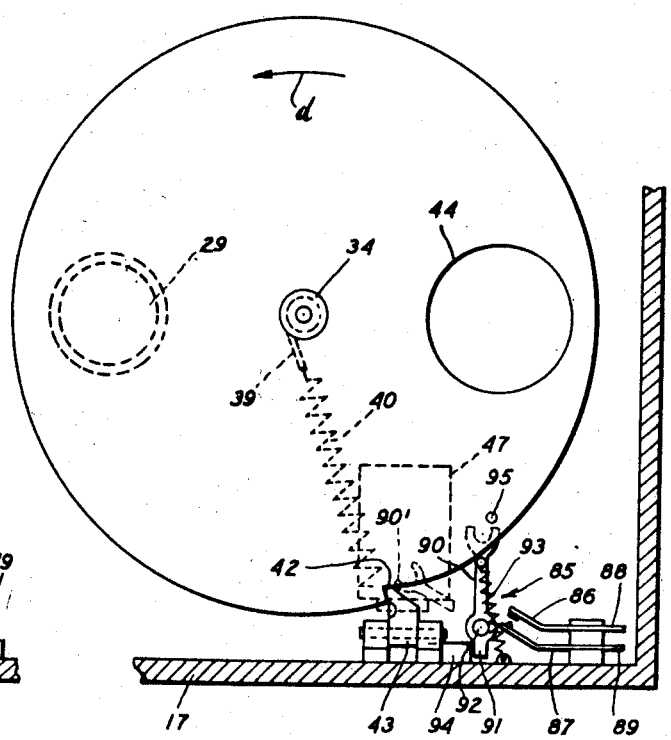
Fig. 2 is a partial section along line 2—2 in Fig. 1.

Such circuit breaker is clearly visible in Figs. 1 and 2, in general denoted by 85. It comprises a pair of resilient contacts 86 and 87 with terminals 88 and 89 respectively; the contacts are secured to the bottom of the housing and they are so shaped that they tend to spread apart a short gap. A lever having a forked arm 90 and a stub arm 91 is pivoted at 92 and a tension spring 93 is so attached to the arm 90 and the housing bottom that the lever will be swung into either one of two end positions if it has once passed a middle position. The one end position is that shown in solid lines in Fig. 2 in which the stub arm 91 bears against an abutment 94. In the other end position, in which the forked arm is shown by dotted lines 90', the stub arm presses against the contact 87 so as to cause the latter to engage the contact 86. The lever can be swung in the one or other direction by a pin 95 secured to the disc 33 intermediate the notch 42 and the opening 44 so as to enter the lever fork and to turn the lever in Fig. 2 in a clockwise direction when the disc rotates in the direction of the arrow $d$ and to reverse the lever when the disc turns in the opposite direction. Consequently, the contact between 86 and 87 will be broken shortly before the detent 43 engages the notch 42 after one counterclockwise revolution of the disc, and the contact stays broken until preparatory to a subsequent operation of the camera the disc 33 is turned one revolution of direction by manipulation of knob 37.

Figure 5:
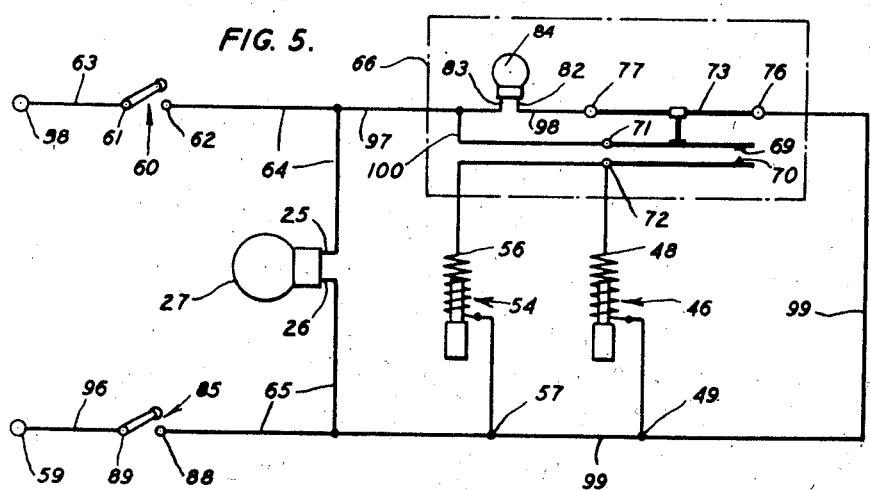
Fig. 5 is a circuit diagram illustrating the electric connections.

As to the electrical connections of the parts only the lamp circuit is shown in Fig. 1. However, a complete circuit diagram is given in Fig. 5 which now will be described. In order to form the lamp circuit, the main terminal 58 of the plug cord 56 is connected to the terminal 61 of the push button switch 60 the other terminal 62 of which is connected by wire 64 to terminal 25 of the lamp 27. A wire 65 connects the lamp terminal 26 to point 88 of the breaker 85 and a wire 96 is provided between the breaker point 89 and the plug cord terminal 59. The delayed-action switch 66 with the resister 84 lies in a circuit parallel to the lamp 27. A wire 97 constituting the continuation of a portion of the lead 64 is connected to the terminal 83 of the resister, and wires 98 and 99 complete the circuit from terminal 82 to the end 77 of the wire 73 and from the other end 76 of the latter to a connection with the lead 65. A branch wire 100 leads from the wire 97 to the terminal 71 of the contact 69 whereas the terminal 72 of the contact 70 is directly connected to the terminals 48 and 56 of the relays 46 and 54 respectively, the other relay terminals 49 and 57 being in connection with the wire 99.

In order to operate the apparatus, a lamp 27 and resister 84 of suitable power are inserted into the sockets 24 and 81 respectively. In a certain camera according to my invention I use for instance a 1500-watt lamp in socket 24 and a 100-watt lamp as the resister 84, to be energized by a 110 to 115-volt current of a general A. C. or D. C. net. In order to obtain a large light intensity and a temperature insuring the correct color of the light, a lamp 27 may be used which is in general destined for a much smaller voltage than applied to it in my apparatus. This may be done because the operation of the camera requires energization of the lamp during a very short time only. Now, in order to take a picture with the camera, the plug 57 may be inserted into a conventional current conducting wall socket, and by turning knob 37, the flexible member 39 will be wound on reel 38, thereby tensioning the spring 40. The disc will, then, be held by detent 43 in the position of Fig. 2. Owing, however, to the preceding rotation of the disc 33 in the direction opposite to arrow $d$, the pin 95 will have turned the forked lever into the position 90' to close the contact 86 and 87 as hereinbefore described. The camera may now be focused upon the object the picture of which is to be taken, and push button 60 may be pressed. Thereby, the lamp circuit will be closed so that current flows from terminal 58 via the circuit elements 63, 60, 64, 27, 65, 85 back to the terminal 59, and the lamp 27 will be energized so as to reach its full candle power within a certain length of time. Simultaneously with the closing of the lamp circuit the parallel circuits 97, 84, 98, 73 and 99 will be closed so that current passes through the wire 73 which will be gradually heated and thus will increase in length. If the resister 84 is correctly chosen the wire will reach the required temperature within approximately the same time as lamp 27 requires to reach its full candle power. The elongation of the wire causes the contact 69 to engage contact 70. In consequence, current will flow from conductor 97, through wire 100, and contacts 69 and 70. Thereafter the current will split into two branches passing through the coils of the relays 46 and 54 respectively, both branches uniting again in conductor 99. The branch currents will energize both relays simultaneously so as to attract their armatures, whereby the armature 53 will pull wire 31 and, thus, immediately open the objective shutter 30. Also, the detent 43 will be immediately withdrawn with the effect that the shutter disc 33 can be turned under the action of spring 40 in the direction of arrow $d$. By the passage of the opening 44 in front of the lens system 29, the path for the light rays of the lamp 27 to the object is temporarily free. This occurs shortly after the opening of the objective shutter, the delay depending on the angular acceleration and speed of the disc 33. When the disc opening has passed the lens system the disc pin 95 will engage the forked lever which, as stated hereinbefore, is in the position 90', and will throw the lever into the position shown in solid lines in Fig. 2. Thereby, the stub arm 91 will be withdrawn from contact 87 so that the latter will separate from contact 86 and all the circuits shown in Fig. 5 will be broken regardless whether or not the button 60 is still pressed. In consequence, the lamp 27, wire 73 and relays 46 and 54 will be deenergized, that means, the lamp 27 will be extinguished, wire 73 will cool down so that contact 69 will be withdrawn from contact 70, the spring (not shown) of the objective shutter 30 will pull back armature 53 through wire 31 and will close the shutter 30, and armature 45 will drop down to raise the detent 43 against the rim of the disc 33 before the completion of the revolution of the disc, thus causing the detent to enter the notch 42 when both register and to arrest the disc in the position of Fig. 2. Hence, all the parts are again in their original position. It will be noticed that repeated pressing of the button 60 is without effect unless the disc 33 is first rewound because otherwise the breaker device 55 stays open so as to prevent the flow of any current through the system.

Thus, the described device is capable of accomplishing the desired result with relatively simple means in an efficient and foolproof manner.

It will be apparent to those skilled in the art that many alterations and modifications of the structure illustrated and described can be made without departure from the spirit and essence of the invention which shall be limited, therefore, only by the scope of the appended claims.

I claim:

1. In an optical device including an objective shutter, an electric lamp, and a lamp shutter, the combination of first electric means to operate said objective shutter, second electric means to actuate said lamp shutter, a switch connected to admit current to said lamp and both said first and said second means, and a current-delaying means between said switch and said first and second means so as to cause a delay of the operation of the shutters with respect to the energization of said lamp.

2. In an optical device including an objective shutter, an electric lamp, and a lamp shutter, the combination of first electric means to operate said objective shutter, second electric means to actuate said lamp shutter, a switch connected to admit current to said lamp and both said first and said second means, and a current-delaying means responsive to the intensity of a current flowing therethrough and arranged between said switch and said first and second means so as to cause a delay of the operation of the shutters with respect to the energization of said lamp.

3. In an optical device including an objective shutter, an electric lamp, and a lamp shutter, the combination of first electric means to operate said objective shutter, second electric means to actuate said lamp shutter, a first hand-operative switch connected to admit current to said lamp and said first and said second means, a second, normally open, switching means between said first switch and said first and second means, an actuator under the control of said first switch and connected to said second switch and responsive to the intensity of a current flowing therethrough to cause closing of said second switching means with a delay in respect to the energization of said lamp.

4. A device as claimed in claim 3, said actuator comprising a piece of wire of predetermined length when cold and so connected to said second switching means as to close the latter owing to its lengthening when heated by a current flowing therethrough.

5. A device as claimed in claim 3, said second switching means comprising a pair of contacts, and resilient means tending to hold the first one of said contacts in engagement with the other, and said actuator comprising a substantially straight piece of wire having its ends in fixed positions in relation to each other, a flexible member connecting said wire, substantially in the middle of its length, with said first contact and being of such a length as to hold said first contact normally apart from the other against the restraint of said resilient means said wire and said contacts being connected to said first switch in parallel circuits.

6. In an optical device including an objective and a lamp, the combination of a momentarily opening objective shutter, a delayed opening lamp shutter, a first electric means to operate said objective shutter, a second electric means to actuate said lamp shutter, a switch connected to admit current to said lamp and both said first and said second means, and a current-delaying means responsive to heat caused by a current flowing to a part thereof and arranged in the connection between said switch and said first and said second means so as to delay operation of the shutters with respect to energization of said lamp.

7. In an optical device including an objective shutter, a lamp, and a lamp shutter, the combination of a first circuit including a first manually operative switch and terminals for said lamp, a second circuit including said first switch, first electric means to operate said objective shutter, second means to actuate said lamp shutter and a normally open second switch controlling the energization of said first and second means, and a third circuit including said first switch and a member mechanically connected to said second switch so as to cause closing of the latter owing to its deformation when heated by current flowing therethrough, said three circuits being parallel to each other.

8. A device as claimed in claim 7 further comprising a third switch and means to connect said third switch operatively to said lamp shutter so that said third switch is closed when said shutter is in a position to be actuated, and that it is open when said lamp shutter has completed its movement, said third switch being common to all said three circuits.

9. In an optical device including an objective and a lamp to illuminate an object upon which said objective is directed, the combination of a lamp shutter mechanism having a starting and an end position of its active movement, electric means to operate the shutter, an automatic switch operatively interconnected with said shutter mechanism so that said switch is closed when said shutter mechanism is in said starting position and is open when said shutter mechanism is close to said end position, a manually operative switch in series connection with said automatic switch, a first circuit in which said lamp is connected, a second circuit in which said electric means are connected, and a third circuit including a device to delay energization of the second circuit with respect to the first circuit, all said circuits being under the control of both said first and said second switch.

GUSTAV BUCKY.

REFERENCES CITED

The following references are of record in the file of this patent:

UNITED STATES PATENTS

| Number | Name | Date |
|---|---|---|
| 2,324,075 | Gillon | July 13, 1943 |
| 1,804,709 | Shoenberg | May 12, 1931 |
| 1,946,894 | Brogger | Feb. 13, 1934 |
| 2,070,175 | Persons | Feb. 9, 1937 |